(12) United States Patent
Schank

(10) Patent No.: US 10,053,215 B2
(45) Date of Patent: Aug. 21, 2018

(54) ELECTRO-HYDRAULIC ON-BLADE ACTUATION SYSTEM

(71) Applicant: Bell Helicopter Textron Inc., Fort Worth, TX (US)

(72) Inventor: Troy Schank, Keller, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 719 days.

(21) Appl. No.: 14/613,009

(22) Filed: Feb. 3, 2015

(65) Prior Publication Data

US 2016/0221673 A1   Aug. 4, 2016

(51) Int. Cl.
*B64C 27/72* (2006.01)

(52) U.S. Cl.
CPC ...... *B64C 27/72* (2013.01); *B64C 2027/7266* (2013.01); *B64C 2027/7272* (2013.01); *Y02T 50/34* (2013.01)

(58) Field of Classification Search
CPC ......... B64C 13/00; B64C 13/02; B64C 13/24; B64C 13/38; B64C 13/40; B64C 13/28; B64C 27/54; B64C 27/56; B64C 27/58; B64C 27/72; B64C 2013/506; B64C 2027/7272; B64C 2027/7266
See application file for complete search history.

(56) References Cited

U.S. PATENT DOCUMENTS

| | | | |
|---|---|---|---|
| 4,530,271 A * | 7/1985 | Cronin | F15B 18/00 91/437 |
| 6,513,762 B2 | 2/2003 | Fink et al. | |
| 8,573,534 B2 * | 11/2013 | Kothera | B64C 27/72 244/99.2 |
| 8,657,229 B2 * | 2/2014 | Schank | B64C 27/615 244/213 |
| 9,604,722 B1 * | 3/2017 | Groen | B64C 27/473 |
| 2004/0075020 A1 * | 4/2004 | Trikha | B64C 13/42 244/99.4 |
| 2007/0069070 A1 * | 3/2007 | Williams | B64C 9/02 244/76 A |
| 2008/0035798 A1 * | 2/2008 | Kothera | B63B 1/248 244/212 |
| 2008/0145221 A1 | 6/2008 | Sun et al. | |
| 2009/0301292 A1 * | 12/2009 | Kothera | B63B 1/248 92/47 |
| 2011/0266391 A1 * | 11/2011 | Kothera | B64C 27/72 244/99.5 |
| 2011/0278392 A1 * | 11/2011 | Fukui | B64C 13/42 244/99.6 |
| 2012/0153073 A1 * | 6/2012 | Groen | B64C 27/473 244/17.13 |
| 2013/0327887 A1 * | 12/2013 | Dyckrup | B64C 9/02 244/99.9 |
| 2014/0360348 A1 * | 12/2014 | Kopp | F15B 15/06 91/159 |
| 2017/0175531 A1 * | 6/2017 | Beckman | F01D 5/141 |

* cited by examiner

*Primary Examiner* — Benjamin P Lee

(57) ABSTRACT

An electro-hydraulic on-blade actuation system includes a pair of linear motors, a pair of flexible bladders and a pair of hydraulic units. Each linear motor outputs linear force in response to input. The pair of flexible bladders attach to opposite sides of a rotorcraft blade. Each hydraulic unit connects a linear motor to a flexible bladder to hydraulically transmit the linear force of the linear motor to the flexible bladder to actuate the rotorcraft blade.

14 Claims, 4 Drawing Sheets

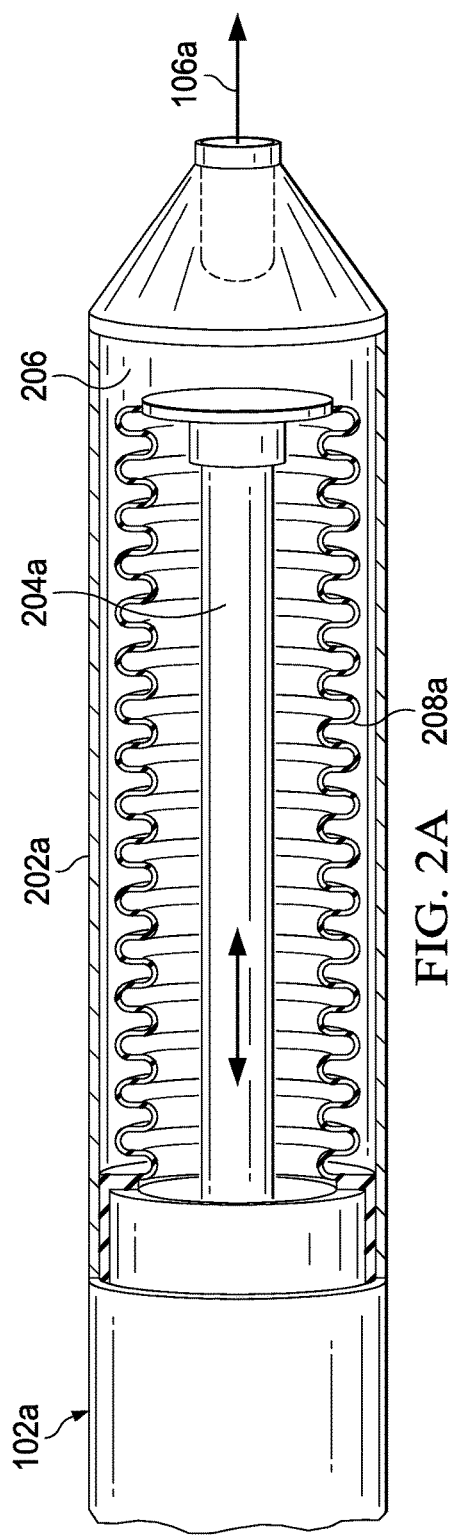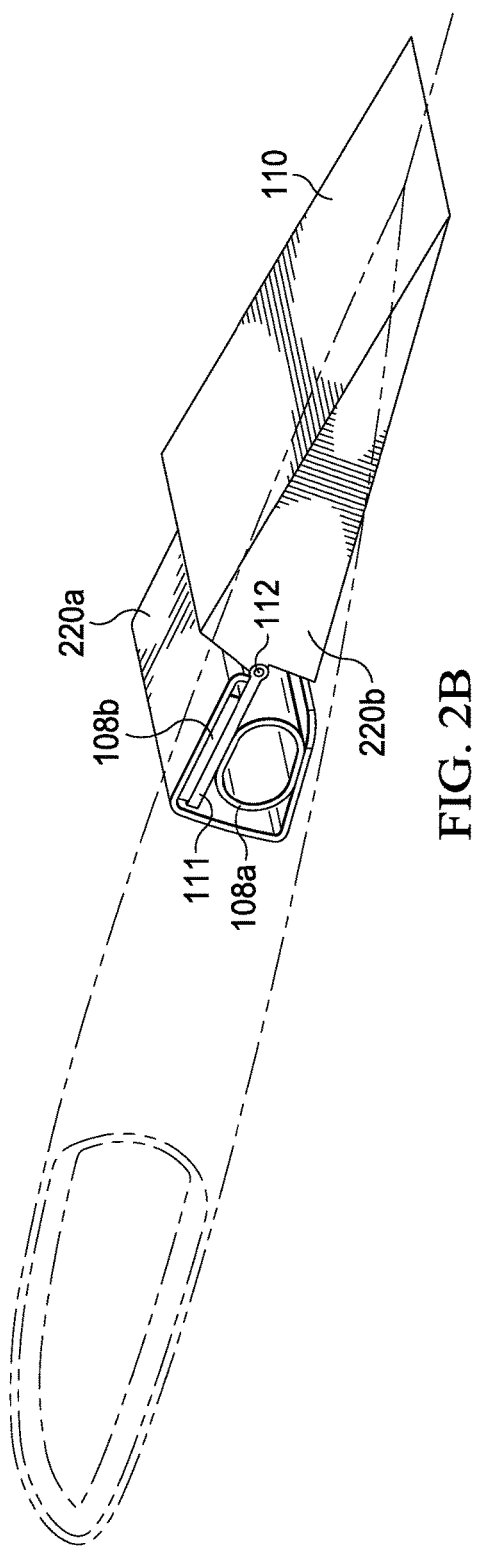

ELECTRO-HYDRAULIC ON-BLADE ACTUATION SYSTEM

TECHNICAL FIELD

This disclosure relates to blade actuation, e.g., rotorcraft blade actuation.

BACKGROUND

Helicopter and tiltrotor aircrafts employ active, on-blade mechanisms that provide enhancements over fixed rotor blade geometry. Such on-blade mechanisms use actuators to convert power into motion and to provide additional stability or assist pilot operation.

SUMMARY

This disclosure describes electro-hydraulic on-blade actuation systems.

Some implementations of the subject matter described here can be implemented as a rotorcraft blade actuation system. The system includes a pair of linear motors, a pair of flexible bladders and a pair of hydraulic units. Each linear motor outputs linear force in response to input. The pair of flexible bladders attach to opposite sides of a rotorcraft blade. Each hydraulic unit connects a linear motor to a flexible bladder to hydraulically transmit the linear force of the linear motor to the flexible bladder to actuate the rotorcraft blade.

This, and other aspects, can include one or more of the following features. Each hydraulic unit can include a fluid chamber connected to a linear motor, a slider in the fluid chamber, and hydraulic fluid in the fluid chamber. The slider can displace the hydraulic fluid in response to receiving the linear force from the linear motor. The fluid chamber can include metal bellows surrounding at least a portion of the slider to seal the hydraulic fluid in the fluid chamber. Each hydraulic unit can include a fluid conduit connecting the fluid chamber to the flexible bladder. The pair of flexible bladders can be configured to attach to opposite sides of a trailing flap of the rotorcraft blade. A first flexible bladder of the pair of flexible bladders can be configured to attach to an upper surface of the trailing flap. A second flexible bladder of the pair of flexible bladders can be configured to attach to a lower Surface of the trailing flap. A controller can provide input power to the pair of linear motors. In response to the input power from the controller, the pair of linear motors can output respective linear forces in opposite directions. The pair of linear motors can be positioned to output the linear forces along substantially a chord length of the rotorcraft blade.

Some aspects of the subject matter described here can be implemented as a method. A first linear force and an opposite second linear force are generated along a chord length of a rotorcraft blade using a first linear motor and a second linear motor, respectively. The first linear force and the second linear force are hydraulically transmitted to a first flexible bladder and a second flexible bladder, respectively. Each of the first flexible bladder and the second flexible bladder is attached to a surface of the rotorcraft blade. The first flexible bladder and the second flexible bladder are expanded and contracted, respectively, in response to the first linear force and the second linear force, respectively, to actuate the rotorcraft blade.

This, and other aspects, can include one or more of the following features. The first linear force can be hydraulically transmitted to the first flexible bladder using a first hydraulic unit that includes a first fluid chamber, a first slider in the first fluid chamber, and hydraulic fluid in the first fluid chamber. The hydraulic fluid in the first slider can be displaced in response to receiving the first linear force. The first fluid chamber can include first metal bellows surrounding at least a portion of the first slider to seal the hydraulic fluid in the first fluid chamber. The hydraulic fluid displaced by the first slider can be transmitted to the first flexible bladder through a first conduit connecting the first fluid chamber to the first flexible bladder. An outer body of the first fluid conduit can include a bend to connect the first fluid chamber to the first flexible bladder. The first flexible bladder and the second flexible bladder can be attached to opposite sides of a trailing flap of the rotorcraft blade. The first flexible bladder and the second flexible bladder can be expanded and contracted, respectively, in response to the first linear force and the second linear force, respectively, to actuate the trailing flap.

Some aspects of the subject matter described here can be implemented as a rotorcraft blade actuation system. The system includes a first linear motor to output linear force in a first direction in response to input and a second linear motor to output linear force in a second direction opposite the first direction in response to input. The system includes a first flexible bladder to attach to a first side of a rotorcraft blade and a second flexible bladder to attach to a second side of the rotorcraft blade, the second side opposite the first side. The system includes a first hydraulic unit connecting the first linear motor to the first flexible bladder to hydraulically transmit the linear force of the first linear motor to the first flexible bladder to actuate the rotorcraft blade and a second hydraulic unit connecting the second linear motor to the second flexible bladder to hydraulically transmit the linear force of the second linear motor to the second flexible bladder to actuate the rotorcraft blade.

This, and other aspects, can include one or more of the following features. The first hydraulic unit can include a first fluid chamber connected to the first linear motor, a first slider in the first fluid chamber, and hydraulic fluid in the first fluid chamber. The first slider can displace the hydraulic fluid in response to receiving the linear force from the first linear motor. The first fluid chamber can include metal bellows surrounding at least a portion of the first slider to seal the hydraulic fluid in the first fluid chamber.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2A is a cross-sectional view of a portion of the example rotorcraft blade actuation system.

FIG. 2B is a schematic diagram of a portion of the example rotorcraft blade actuation system attached to a trailing flap of a rotorcraft blade.

Like reference numbers and designations in the various drawings indicate like elements.

DETAILED DESCRIPTION

Helicopter and tiltrotor systems employ active, on-blade mechanisms, e.g., trailing flaps (TEF), leading edge droops, or other on-blade mechanisms, that provide enhancements over fixed rotor blade geometry. Such enhancements can include vibration reduction, noise reduction and performance enhancements to name a few. The active mechanisms can be driven using actuators that convert power into the required motion. Active rotors need to transfer actuator motion to the aerodynamic effector. For a trailing flap, for example, such transfer can be achieved using linkages that penetrate through the external contour of the blade. Active rotor benefits can be achieved by implementing light-weight, powerful actuators that have sufficient force, stroke and bandwidth with a minimum volume and mass.

Some hydraulic actuation systems that use a pump, accumulator, servo-valve and ram or vane output can be heavy. The components of such systems can sometimes not be robust enough for large accelerations of on-blade environments. Other actuation systems can provide some benefits but suffer from other drawbacks. For example, piezo-electric actuators can have high bandwidth but lack stroke. Electromechanical actuators, e.g., actuators that implement a motor and ball screw, can have large stroke and force but lack bandwidth. Combination actuators that combine piezo electric and electro-mechanical principles can be complex and heavy. Also, actuator systems that implement linkages to transfer actuator motion to the aerodynamic effector can increase drag and employ hinges that wear and allow backlash or slop in the control of the flap.

Electromagnetic actuators, both limited angle torque (LAT) motors and linear motors, can serve as actuator systems. Linear motors typically have higher power densities for on-blade applications and can be more efficient than LAT motors. This disclosure describes an electro-hydraulic on-blade actuation system. The actuation system described here can be packaged inside a blade and has a combination of large displacement (stroke) and large bandwidth (frequency of actuation). The actuation system described here is light-weight and capable of handling environmental vibration, temperature variations, and other physical phenomena that can affect actuation system performance.

Figure 1:
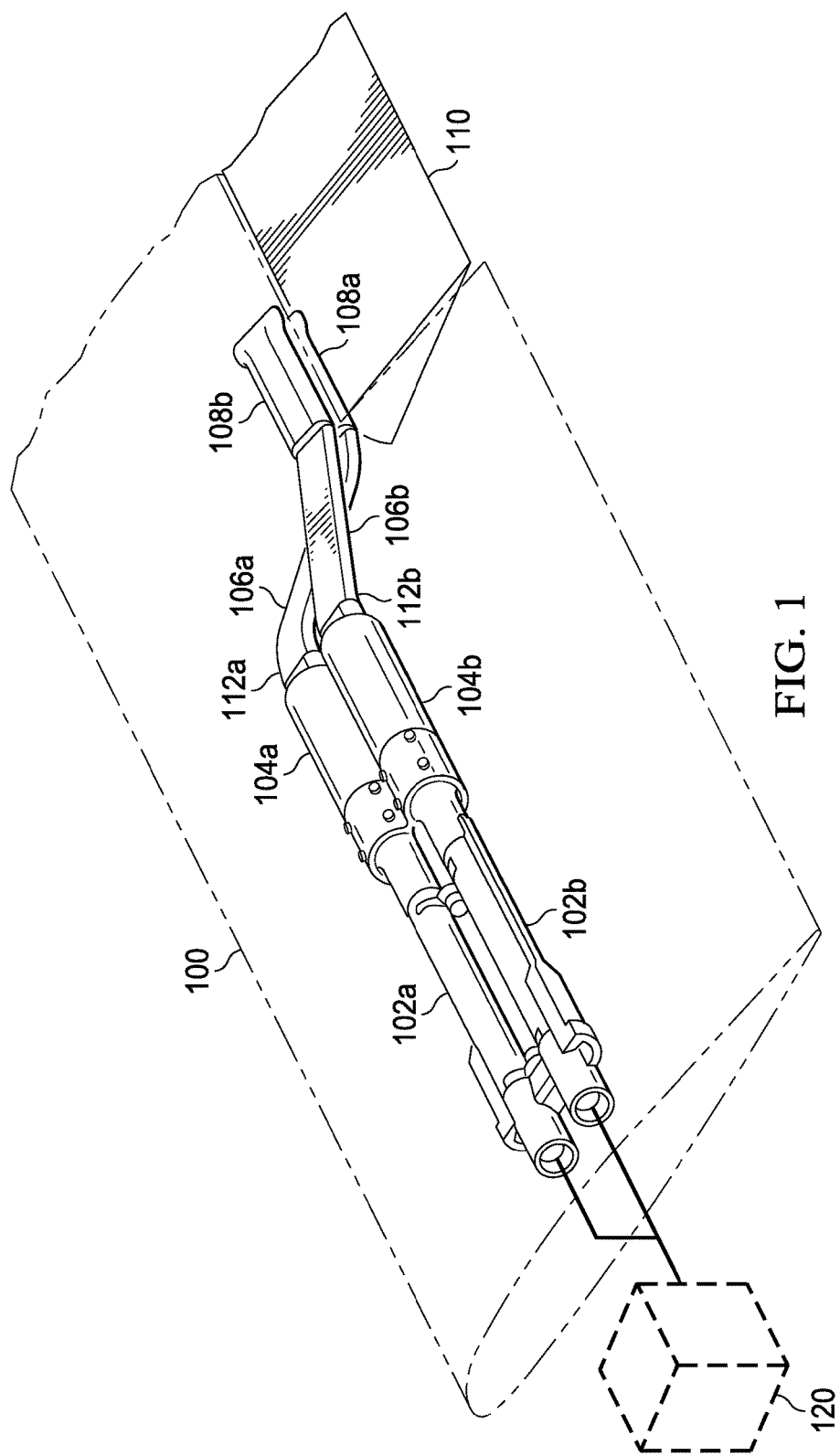
FIG. 1 is a schematic diagram of an example rotorcraft blade actuation system.

FIG. 1 is a schematic diagram of an example rotorcraft blade actuation system mounted on a rotorcraft blade 100. The actuation system includes a pair of linear motors (e.g., a first linear motor 102a and a second linear motor 102b) positioned along substantially a chord length of the rotorcraft blade 100. Each linear motor outputs linear force in response to input. Each linear motor is an electro-dynamic actuator, for example, like a speaker coil. Each linear motor serves as a force generator and is sized to fit on or inside the rotorcraft blade 100. The actuation system includes a pair of flexible bladders (e.g., a first flexible bladder 108a and a second flexible bladder 108b) attached to opposite sides of the rotorcraft blade 100. For example, one end of the first flexible bladder 108a is connected to one side (e.g., bottom surface) of a trailing flap 110 of the rotorcraft blade 100. One end of the second flexible bladder 108b is connected to the opposite side (e.g., top surface) of the trailing flap 110.

The actuation system includes a pair of hydraulic units (e.g., a first hydraulic unit 104a and a second hydraulic unit 104b). Each hydraulic unit connects a linear motor to a flexible bladder to hydraulically transmit the linear force of the linear motor to the flexible bladder to actuate the rotorcraft blade 100. For example, one end of the first hydraulic unit 104a is connected to an end of the first linear motor 102a. The other end of the first hydraulic unit 104a is connected to the end of the first flexible bladder 108a that is not connected to the bottom surface of the trailing flap 110. The first hydraulic unit 104a transmits the linear force of the first linear motor 102a to the first flexible bladder 108a to actuate the trailing flap 110.

Similarly, one end of the second hydraulic unit 104b is connected to an end of the second linear motor 102b. The other end of the second hydraulic unit 104b is connected to the end of the second flexible bladder 108b that is not connected to the top surface of the trailing flap 110. The second hydraulic unit 104b transmits the linear force of the second linear motor 102b to the second flexible bladder 108b to actuate the trailing flap 110.

When the pair of linear motors are operated to output opposing forces (i.e., the first linear motor 102a outputs a push while the second linear motor 102b outputs a pull, and vice versa), the trailing flap 110 is operated to actuate upward and downward. For example, each linear motor includes a respective piston that translates back-and-forth based on the input provided to the linear motor. As described below, the hydraulic unit converts the back-and-forth translation of the piston into an expansion and contraction of the flexible bladder that is connected to the hydraulic unit, thereby actuating the trailing flap 110.

FIG. 2A is a cross-sectional view of a portion of the example rotorcraft blade actuation system, specifically, the first hydraulic unit 104a. The first hydraulic unit 104a includes a fluid chamber 202a connected to the first linear motor 102a. The first hydraulic unit 104a also includes a slider 204a in the fluid chamber 202a. The fluid chamber 202a is at least partially filled with hydraulic fluid 206, e.g., a low viscosity fluid capable of operating under rotorcraft conditions. The first hydraulic unit 104a includes metal bellows 208a surrounding at least a portion of the slider 204a to seal, for example, hermetically or otherwise, the hydraulic fluid 206 in the fluid chamber 202a. The first hydraulic unit 104a also includes a first fluid conduit 106a that connects the fluid chamber 202a to the first flexible bladder 108a. The first fluid conduit 106a can include a first bend 112a to connect the first hydraulic unit 104a to the first flexible bladder 108a.

Similar to the first hydraulic unit 104a, the second hydraulic unit 104b includes a fluid chamber connected to the second linear motor 102b. The second hydraulic unit 104b also includes a slider in the fluid chamber. The fluid chamber is at least partially filled with hydraulic fluid, e.g., a low Viscosity fluid capable of operating under rotorcraft conditions. The second hydraulic unit 104b also includes metal bellows surrounding at least a portion of the slider to seal, for example, hermetically or otherwise, the hydraulic fluid in the fluid chamber. The second hydraulic unit 104b also includes a second fluid conduit 106b that connects the fluid chamber to the second flexible bladder 108b. The second fluid conduit 106b can include a second bend 112b to connect the second hydraulic unit 104b to the second flexible bladder 108b. In some implementations, the first bend 112a in the first conduit 106a can be greater than the second bend 112b in the second conduit 106b based on a positioning of the conduits inside the rotorcraft blade 100.

The slider 204a displaces the hydraulic fluid 206 in response to receiving the linear force from the first linear motor 102a. For example, the slider 204a can be connected to or be an extension of the piston of the first linear motor 102a, and can translate back-and-forth with the piston. When the first linear motor 102a produces a push force, the slider 204a transmits the push force onto the hydraulic fluid 206 in the first fluid conduit 106a toward the first flexible bladder 108a. The push force increases a fluid pressure of the hydraulic fluid 206 in the first fluid conduit 106a, thereby expanding the first flexible bladder 108a. Conversely, when the first linear motor 102a produces a pull force, the slider 204a transmits the pull force onto the hydraulic fluid 206 in the first fluid conduit 106a. The pull force decreases a fluid pressure of the hydraulic fluid 206 in the first fluid conduit 106a, thereby contracting the first flexible bladder 108a.

Similar to the first hydraulic unit 104a, the slider in the second hydraulic unit 104b displaces the hydraulic fluid in response to receiving the linear force from the second linear motor 102b. For example, the slider can be connected to or be an extension of the piston of the second linear motor 102b, and can translate back-and-forth with the piston. When the second linear motor 102b produces a push force, the slider transmits the push force onto the hydraulic fluid in the second fluid conduit 106b. The push force increases a fluid pressure of the hydraulic fluid in the second fluid conduit 106b, thereby expanding the second flexible bladder 108b. Conversely, when the second linear motor 102b produces a pull force, the slider transmits the pull force onto the hydraulic fluid in the second fluid conduit 106b. The pull force decreases a fluid pressure of the hydraulic fluid in the second fluid conduit 106b, thereby contracting the second flexible bladder 108b.

The pressure differential in the hydraulic fluid resulting from the pushing/pulling of the two hydraulic units causes flap actuation. For example, when the first hydraulic unit 104a increases the fluid pressure of the hydraulic fluid 206 in the first fluid conduit 106a causing the first flexible bladder 108a to expand and the second hydraulic unit 104b decreases the fluid pressure of the hydraulic fluid in the second fluid conduit 106b causing the second flexible bladder 108b to contract, then the resulting pressure differential pushes the trailing flap 110 away from the first flexible bladder 108a and towards the second flexible bladder 108b, i.e., upward. Conversely, when the first hydraulic unit 104a decreases the fluid pressure of the hydraulic fluid 206 in the first fluid conduit 106a causing the first flexible bladder 108a to contract and the second hydraulic unit 104b increases the fluid pressure of the hydraulic fluid in the second fluid conduit 106b causing the second flexible bladder 108b to expand, then the resulting pressure differential pushes the trailing flap 110 away from the second flexible bladder 108b and towards the first flexible bladder 108a, i.e., downward.

FIG. 2B is a schematic diagram of a portion of the example rotorcraft blade actuation system attached to the trailing flap 110 of the rotorcraft blade 100. In some implementations, the first flexible bladder 108a and the second flexible bladder 108b can be housed in a bladder structural box 220a. In the example shown in FIG. 2B, the first flexible bladder 108a is in an expanded state and the second flexible bladder 108b is in a contracted state. The resultant force causes the input lever 111 to move upwards and the external trailing edge flap 110 to deflect downwards as it rotates about the flap hinge 112. When the first flexible bladder 108b is in a contracted state and the second flexible bladder 108b is in an expanded state, the resultant force on the input lever 111 is downward with the trailing edge flap 110 deflecting upwards as it rotates about the flap hinge 112.

Figure 3:
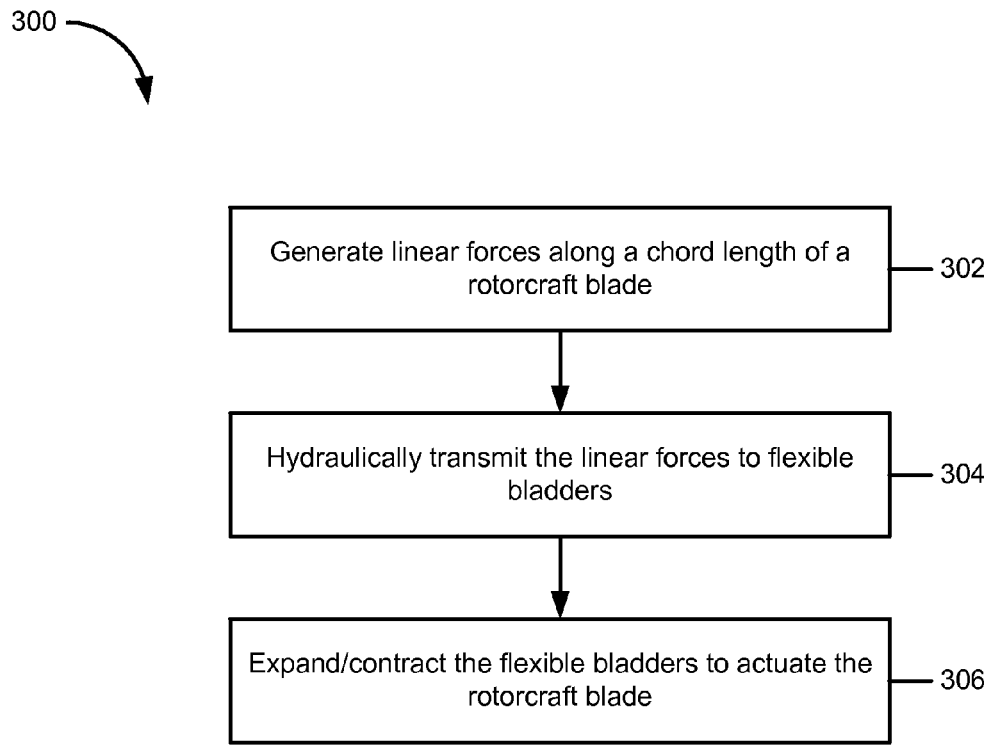
FIG. 3 is a flowchart of an example process for actuating the trailing flap of a rotorcraft blade.

FIG. 3 is a flowchart of an example process 300 for actuating the trailing flap of a rotorcraft blade. The process 300 can be implemented, for example, by a controller 120 included in the rotorcraft blade actuation system. At 302, linear forces are generated along a chord length of a rotorcraft blade. For example, in response to input from an operator (e.g., a pilot or other operator), the controller 120 can provide input power signals, e.g., current or voltage, to the first linear motor 102a and the second linear motor 102b. In response to the input power signals, the first linear motor 102a and the second linear motor 102b can provide a first linear force and an opposite second linear force, respectively, along the chord length of the rotorcraft blade using. At 304, the linear forces are hydraulically transmitted to flexible bladders. For example, the first linear motor 102a and the second linear motor 102b can transmit the first linear force and the second linear force, respectively, to the first flexible bladder 108a and the second flexible bladder 108b, respectively, through the first hydraulic conduit 104a and the first fluid conduit 112a, and the second hydraulic conduit 104b and the second fluid conduit 112b, respectively. At 306, the flexible bladders are expanded/contracted to actuate the rotorcraft blade. For example, the first flexible bladder and the second flexible bladder are simultaneously expanded and contracted (or contracted and expanded), respectively, in response to the first linear force and the second linear force. The actuation causes the rotorcraft blade to actuate.

Figure 4:
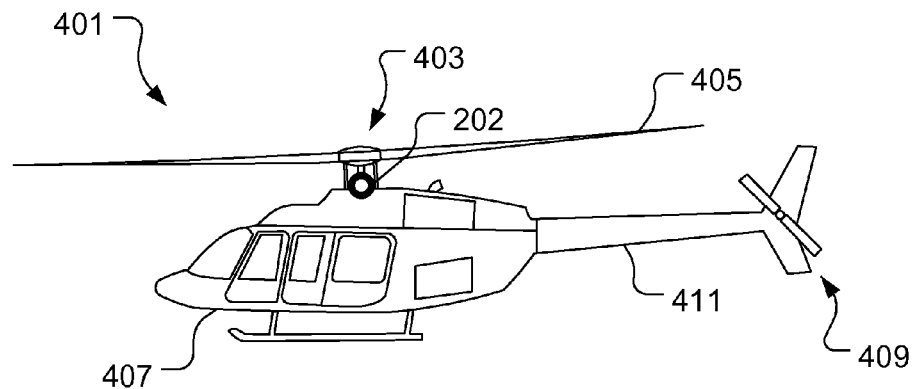
FIG. 4 shows a schematic diagram of an example rotorcraft.
Figure 5:
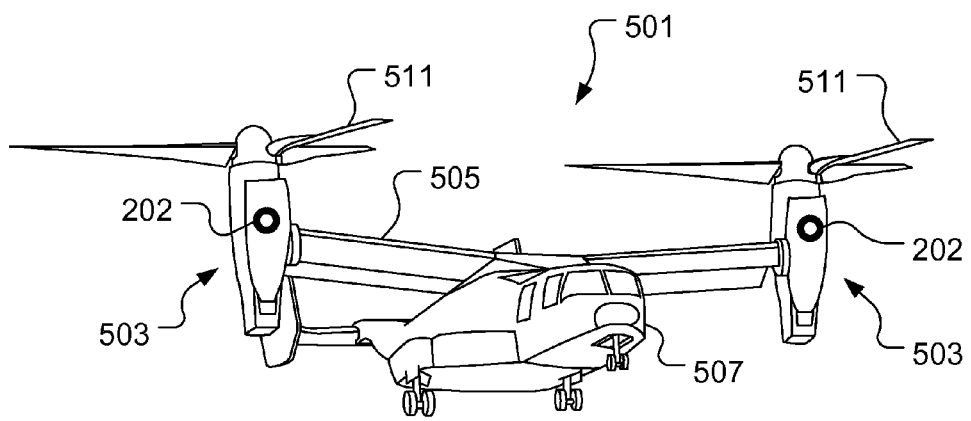
FIG. 5 shows a schematic diagram of an example rotorcraft.

The example actuation system can be implemented in an aircraft. As an example, FIG. 4 shows a schematic diagram of an example rotorcraft 401. Rotorcraft 401 has a rotor system 403 with multiple rotor blades 405. Rotorcraft 401 can further include a fuselage 407, anti-torque system 409, and an empennage 411. As another example aircraft, FIG. 5 shows a schematic diagram of an example tiltrotor aircraft 501. Aircraft 501 includes a fuselage 507 with attached wings 505. Nacelles 503 are carried at the outboard ends of wings 505 and are rotatable between the helicopter-mode position shown and a forward-facing airplane-mode position (not shown). Nacelles 503 carry engines and transmissions for powering rotor systems 511 in rotation. An engine may be an internal combustion engine, an electrical power source and associated motor, or any other suitable technique for powering rotor system 511. In general, the actuation system described here can be implemented in any system in which active, on-blade control mechanisms can be helpful, e.g., in wind turbines or other systems.

Thus, particular implementations of the subject matter have been described. Other implementations are within the scope of the following claims.

The invention claimed is:
1. A rotorcraft blade actuation system comprising:
 a pair of linear motors, each linear motor to output linear force in response to input;
 a pair of flexible bladders to attach to opposite sides of a rotorcraft blade; and
 a pair of hydraulic units, each hydraulic unit comprising a fluid chamber connecting one of the linear motors to one of the flexible bladders, a slider in the fluid chamber to displace a hydraulic fluid in the fluid chamber to hydraulically transmit the linear force of the linear motor to the flexible bladder to actuate the rotorcraft blade, and a metal bellows surrounding at least a portion of the slider to seal the hydraulic fluid in the fluid chamber.
2. The system of claim 1, wherein each hydraulic unit further comprises a fluid conduit connecting the fluid chamber to the flexible bladder.

3. The system of claim 2, wherein an outer body of the fluid conduit includes a bend to connect the fluid chamber to the flexible bladder.

4. The system of claim 1, wherein the pair of flexible bladders are configured to attach to opposite sides of a trailing flap of the rotorcraft blade.

5. The system of claim 4, wherein a first flexible bladder of the pair of flexible bladders is configured to attach to an upper surface of the trailing flap and a second flexible bladder of the pair of flexible bladders is configured to attach to a lower surface of the trailing flap.

6. The system of claim 1, further comprising a controller to provide input power to the pair of linear motors.

7. The system of claim 6, wherein, in response to the input power from the controller, the pair of linear motors output respective linear forces in opposite directions.

8. The system of claim 1, wherein the pair of linear motors are positioned to output the linear forces along substantially a chord length of the rotorcraft blade.

9. A method comprising:
generating a first linear force and an opposite second linear force along a chord length of a rotorcraft blade using a first linear motor and a second linear motor, respectively;
hydraulically transmitting the first linear force and the second linear force to a first flexible bladder and a second flexible bladder using a first hydraulic unit and a second hydraulic unit, respectively, each of the first flexible bladder and the second flexible bladder attached to a surface of the rotorcraft blade, wherein the first hydraulic unit comprises a first fluid chamber, a first slider in the first fluid chamber that displaces a first hydraulic fluid in response to the first linear force and a first metal bellows surrounding at least a portion of the first slider to seal the first hydraulic fluid in the first fluid chamber, and the second hydraulic unit comprises a second fluid chamber, a second slider in the first fluid chamber that displaces a second hydraulic fluid in response to the second linear force and a second metal bellows surrounding at least a portion of the second slider to seal the second hydraulic fluid in the second fluid chamber; and
expanding and contracting the first flexible bladder and the second flexible bladder, respectively, in response to the first linear force and the second linear force, respectively, to actuate the rotorcraft blade.

10. The method of claim 9, further comprising:
transmitting the first hydraulic fluid displaced by the first slider to the first flexible bladder through a first conduit connecting the first fluid chamber to the first flexible bladder; and
transmitting the second hydraulic fluid displaced by the second slider to the second flexible bladder through a second conduit connecting the second fluid chamber to the second flexible bladder.

11. The method of claim 10, wherein:
an outer body of the first fluid conduit includes a first bend to connect the first fluid chamber to the first flexible bladder; and
an outer body of the second fluid conduit includes a second bend to connect the second fluid chamber to the second flexible bladder.

12. The method of claim 9, further comprising attaching the first flexible bladder and the second flexible bladder to opposite sides of a trailing flap of the rotorcraft blade.

13. The method of claim 12, further comprising expanding and contracting the first flexible bladder and the second flexible bladder, respectively, in response to the first linear force and the second linear force, respectively, to actuate the trailing flap.

14. A rotorcraft blade actuation system comprising:
a first linear motor to output linear force in a first direction in response to input;
a second linear motor to output linear force in a second direction opposite the first direction in response to input;
a first flexible bladder to attach to a first side of a rotorcraft blade;
a second flexible bladder to attach to a second side of the rotorcraft blade, the second side opposite the first side;
a first hydraulic unit comprising a first fluid chamber connecting the first linear motor to the first flexible bladder, a first slider in the first fluid chamber to displace a first hydraulic fluid in response to receiving the linear force from the first linear motor, a first metal bellows surrounding at least a portion of the first slider to seal a first hydraulic fluid in the first fluid chamber and to hydraulically transmit the linear force of the first linear motor to the first flexible bladder to actuate the rotorcraft blade; and
a second hydraulic unit comprising a second fluid chamber connecting the second linear motor to the second flexible bladder, a second slider in the second fluid chamber to displace a second hydraulic fluid in response to receiving the linear force from the second linear motor, a second metal bellows surrounding at least a portion of the second slider to seal the second hydraulic fluid in the second fluid chamber and to hydraulically transmit the linear force of the second linear motor to the second flexible bladder to actuate the rotorcraft blade.

* * * * *